US008795557B2

(12) United States Patent
Elkovitch

(10) Patent No.: US 8,795,557 B2
(45) Date of Patent: Aug. 5, 2014

(54) FLAME RESISTANT POLYPHTHALAMIDE/POLY(ARYLENE ETHER) COMPOSITION

(75) Inventor: Mark Elkovitch, Selirk, NY (US)

(73) Assignee: Sabic Innovative Plastics IP B.V. (NL)

( * ) Notice: Subject to any disclaimer, the term of this patent is extended or adjusted under 35 U.S.C. 154(b) by 931 days.

(21) Appl. No.: 12/264,352

(22) Filed: Nov. 4, 2008

(65) Prior Publication Data

US 2009/0242844 A1 Oct. 1, 2009

Related U.S. Application Data

(60) Provisional application No. 61/040,932, filed on Mar. 31, 2008.

(51) Int. Cl.
*C09K 21/12* (2006.01)

(52) U.S. Cl.
USPC ............ 252/609; 252/601; 524/126; 524/133

(58) Field of Classification Search
CPC ......... C08L 77/00; C08L 77/06; C08L 77/10; C08K 5/5313; C08K 5/0066; C08K 3/32
USPC .................. 252/601, 609; 524/115, 126, 133
See application file for complete search history.

(56) References Cited

U.S. PATENT DOCUMENTS

| | | | |
|---|---|---|---|
| 4,200,707 A | 4/1980 | Richardson | |
| 4,565,684 A | 1/1986 | Tibbetts et al. | |
| 4,572,813 A | 2/1986 | Arakawa | |
| 4,663,230 A | 5/1987 | Tennent | |
| 4,816,289 A | 3/1989 | Komatsu et al. | |
| 4,876,078 A | 10/1989 | Arakawa et al. | |
| 5,024,818 A | 6/1991 | Tibbetts et al. | |
| 5,132,365 A | 7/1992 | Gallucci | |
| 5,165,909 A | 11/1992 | Tennent et al. | |
| 5,397,838 A | 3/1995 | Ohtomo et al. | |
| 5,468,530 A | 11/1995 | Goetz et al. | |
| 5,576,387 A | 11/1996 | Chambers | |
| 5,589,152 A | 12/1996 | Tennent et al. | |
| 5,591,382 A | 1/1997 | Nahass et al. | |
| 5,843,340 A | 12/1998 | Silvi et al. | |
| 5,916,970 A | 6/1999 | Lee, Jr. et al. | |
| 6,111,016 A | 8/2000 | Katayama et al. | |
| 6,284,830 B1 | 9/2001 | Gottschalk et al. | |
| 6,423,768 B1 | 7/2002 | Khouri | |
| 6,531,529 B2 | 3/2003 | Bersted et al. | |
| 6,531,530 B2 | 3/2003 | Asano | |
| 6,593,411 B2 | 7/2003 | Koevoets et al. | |
| 6,599,446 B1 | 7/2003 | Todt et al. | |
| 6,630,526 B2 | 10/2003 | Heinen et al. | |
| 6,767,941 B2 | 7/2004 | Van Der Spek et al. | |
| 7,205,346 B2 | 4/2007 | Harashina | |
| 7,226,963 B2 | 6/2007 | Koevoets et al. | |
| 2003/0216533 A1 | 11/2003 | Sicken et al. | |
| 2005/0014874 A1 | 1/2005 | Hoerold et al. | |
| 2005/0250885 A1 | 11/2005 | Mercx et al. | |
| 2006/0058432 A1 | 3/2006 | Perego et al. | |
| 2006/0111484 A1 | 5/2006 | Fishburn | |
| 2006/0167144 A1* | 7/2006 | Borade et al. ................. 524/115 |
| 2007/0040154 A1 | 2/2007 | Murakami | |
| 2007/0299171 A1 | 12/2007 | Couillens et al. | |
| 2009/0069471 A1 | 3/2009 | Terada et al. | |

FOREIGN PATENT DOCUMENTS

| | | |
|---|---|---|
| EP | 0699708 | 3/1996 |
| WO | 2005118698 | 12/2005 |
| WO | 2006009983 | 1/2006 |
| WO | 2006055732 | 5/2006 |
| WO | 2007126644 | 11/2007 |

OTHER PUBLICATIONS

Phosphorus-based flame retardants for thermoplastics, Schmitt, Plastics Additives & Compounding, May/Jun. 2007, 26-30.*
UL94, Tests for Flammability of Plastic Materials for Parts in Devices and Appliances, Oct. 29, 1996, 52 pages.
European Publication No. 0183195 A2; Publication Date Jun. 4, 1986; Human Translation; 11 pages.
European Publication No. 0501175 A1; Publication Date Sep. 2, 1992; Human Translation; 21 pages.
International Search Report for International Application No. PCT/US2009/038391, mailed Nov. 9, 2009, 9 pages.
Written Opinion for International Application No. PCT/US2009/038391, mialed Nov. 9, 2009, 5 pages.

* cited by examiner

*Primary Examiner* — Mark Kopec
*Assistant Examiner* — Haidung Nguyen
(74) *Attorney, Agent, or Firm* — Cantor Colburn LLP

(57) ABSTRACT

Disclosed herein is a flame resistant composition comprising a compatibilized blend of a polyphthalamide and a poly(arylene ether); and a phosphinate, wherein the composition is substantially free of linear aliphatic polyamides.

22 Claims, No Drawings

FLAME RESISTANT POLYPHTHALAMIDE/POLY(ARYLENE ETHER) COMPOSITION

CROSS REFERENCE TO RELATED APPLICATIONS

This application claims the benefit of U.S. Provisional Patent Application No. 61/040,932 filed on Mar. 31, 2008 and which is incorporated by reference herein in its entirety.

BACKGROUND OF INVENTION

This application relates to polyphthalamide/poly(arylene ether) blends and more particularly to flame retardant polyphthalamide/poly(arylene ether) blends.

Polyphthalamides (PPA) are semi-aromatic, high temperature nylons that typically have melting points higher than 290° C. and glass transitions temperatures greater than 100° C. PPAs are generally based on polyamide 6T. However polyamide 6T has a melting point of 370° C., and therefore is difficult to process and/or blend with other polymers, such as polyphenylene ether (PPE). PPAs generally are copolymers that have various ratios of polyamide 6T, polyamide 6I, and polyamide 6/6 to control properties such as melt flow, melting point, and glass transition temperature.

PPAs and high temperature nylons are widely used in applications that require a very high resistance to heat. Electrical connectors such as those found in computers, cell phones, and flat panel televisions use these polymers extensively. These electrical connector applications also frequently require the material be flame retardant at thicknesses at or below 1.0 millimeter (mm). Flame resistance is difficult to achieve for articles with lower thicknesses while maintaining or improving mechanical properties.

Popular flame retardants for PPAs include halogenated flame retardant systems such as brominated flame retardant systems. However, there is an increasing trend to reduce or halt the use of halogenated flame retardant systems. However, PPAs generally require a large amount of non-halogenated flame retardants to achieve good flame retardant performance. High levels of non-halogenated flame retardants can have a negative impact on overall physical properties. Additionally, given the high temperatures processing temperatures required for PPAs many non-halogenated flame retardants cannot be used due to degradation. Accordingly there remains a need for non-halogenated flame retardant PPA materials with good physical properties.

BRIEF DESCRIPTION OF THE INVENTION

The above-described and other drawbacks are alleviated by a flame resistant composition comprising
  a compatibilized blend of a polyphthalamide and a poly(arylene ether); and
  a phosphinate,
  wherein the composition is substantially free of linear aliphatic polyamides.

Also described herein are injection molded articles comprising the composition of the preceding paragraph.

A masterbatch comprising the polyphthalamide and the phosphinate is also described herein.

Also disclosed herein is a method of making a flame resistant composition comprising melt blending components comprising a poly(arylene ether), a functionalizing agent and a polyphthalamide to form a first mixture and then melt blending the first mixture with masterbatch comprising a polyphthalamide and a phosphinate, wherein the composition is substantially free of aliphatic polyamide.

DETAILED DESCRIPTION OF THE INVENTION

The compositions described herein exhibit excellent flame retardancy, as determined, for example, according to Underwriter's Laboratory Bulletin 94, "Tests for Flammability of Plastic Materials, UL 94". For example, the compositions have a flammability rating of V-1 or better, or, more specifically V-0, measured according to the UL 94 Vertical Burning Test at a thickness of 3 millimeters (mm). Surprisingly, the flame retardancy can be maintained at even lower thicknesses. For example, in some embodiments, the composition has a flammability rating of V1 or better, or, more specifically V-0, measured according to the UL 94 Vertical Burning Test at a thickness of 2 millimeters. Additionally, in some embodiments, the composition has a flammability rating of V-1 or better, or, more specifically V-0, measured according to the UL 94 Vertical Burning Test at a thickness of 1 millimeter.

In some embodiments less than or equal to 6, or, more specifically, less than or equal to 3, bars out of 50 bars will burn for more than 10 seconds. The bars have a thickness of 1 millimeter and the shape required by the UL 94 test. Testing conditions for determining the number of burning bars out of 50 bars are the same as UL 94.

The compositions described herein are substantially free of aliphatic polyamides. Substantially free of aliphatic polyamide is defined as containing less than or equal to 2 weight percent, or, more specifically less than or equal to 1 weight percent, or, more specifically, less than or equal to 0.5 weight percent of an aliphatic polyamide, based on the total weight of the composition. It has been discovered that the inclusion of aliphatic polyamides in combination with a polyphthalamide increases the flammability (decreases the flame retardance) compared to compositions containing polyphthalamide in an amount equal to the combined amount of the polyphthalamide and aliphatic polyamide. Aliphatic polyamides are distinguished from polyphthalamides in that aliphatic polyamides have no repeating units that comprise aromatic moieties. Aliphatic polyamides include both homopolymers and copolymers.

Polyphthalamides comprise repeating units having formula (I)

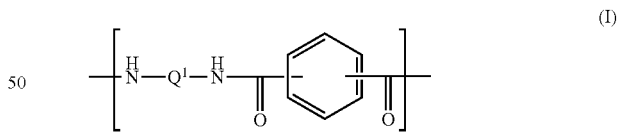

wherein $Q^1$ is independently at each occurrence a branched or unbranched alicyclic alkyl group having 4 to 8 carbons. In some embodiments, $Q^1$ is independently at each occurrence a 1,6-hexyl group. Polyamide resins, in general characterized by the presence of an amide group (—C(O)NH—) which is the condensation product of a carboxylic acid and an amine. Polyphthalamides are the condensation product of terephthalic acid and an amine, isophthalic acid and an amine or a combination of terephthalic acid, isophthalic acid and an amine. When employing more than one diamine the ratio of the diamines can affect some of the physical properties of the resulting polymer such as the melt temperature. When employing more than one acid, the ratio of the acids can affect some of the physical properties of the resulting polymer as well. The ratio of diamine to dicarboxylic acid is typically equimolar although excesses of one or the other may be used to determine the end group functionality. In addition the reaction can further include monoamines and monocarboxylic acids which function as chain stoppers and determine, at least in part, the end group functionality. In some embodiments it is preferable to have an amine end group content of greater than or equal to about 30 milliequivalents per gram (meq/g), or, more specifically, greater than or equal to about 40 meq/g.

In some embodiments the polyphthalamide is a block copolymer or a random copolymer comprising the units of formula (I) and units of formula (II)

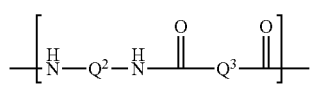
(II)

wherein $Q^2$ and $Q^3$ are independently at each occurrence a branched or unbranched alicyclic alkyl group having 4 to 12 carbons. $Q^2$ and $Q^3$ can be the same or different alicyclic alkyl group.

The polyphthalamide is present in an amount of 15 to 80 weight percent based on the total weight of the composition. Within this range the amount of polyphthalamide can be greater than or equal to 20 weight percent, or, more specifically, greater than or equal to 25 weight percent. Also within this range the amount of polyphthalamide can be less than or equal to 70 weight percent, or, more specifically, less than or equal to 60 weight percent.

In addition to polyphthalamide, the flame resistant composition comprises a poly(arylene ether). Poly(arylene ether) comprises repeating structural units of formula (III)

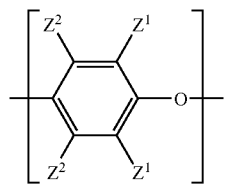
(III)

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising two or more of the foregoing polymers. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

A portion of the poly(arylene ether) can be functionalized with a polyfunctional compound (functionalizing agent) as described below. The poly(arylene ether) can be functionalized prior to making the composition or can be functionalized as part of making the composition. Furthermore, prior to functionalization the poly(arylene ether) can be extruded, for example to be formed into pellets. It is also possible for the poly(arylene ether) to be melt mixed with other additives that do not interfere with functionalization. Exemplary additives of this type include flame retardants, flow promoters, and the like.

In some embodiments the poly(arylene ether) can comprise 0.1 weight percent weight percent to 90 weight percent of structural units derived from a functionalizing agent, based on the total weight of the poly(arylene ether). Within this range, the poly(arylene ether) can comprise less than or equal to 80 weight percent, or, more specifically, less than or equal to 70 weight percent of structural units derived from functionalizing agent, based on the total weight of the poly (arylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of 0.1 to 0.60 deciliters per gram (dl/g), as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

The poly(arylene ether) is present in an amount of 5 to 50 weight percent based on the total weight of the composition. Within this range the poly(arylene ether) may be present in an amount greater than or equal to 10 weight percent, or, more specifically, greater than or equal to 15 weight percent. Also within this range the poly(arylene ether) can be present in an amount of less than or equal to 40 weight percent, or, more specifically, less than or equal to 30 weight percent.

The compatibilized polyphthalamide/poly(arylene ether) blend is formed using a functionalizing agent. When used herein, the expression "functionalizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized polyphthalamide/poly (arylene ether) composition appears to exhibit improved compatibility, particularly as evidenced by enhanced impact strength, mold knit line strength and/or elongation. As used herein, the expression "compatibilized polyphthalamide/poly (arylene ether) blend" refers to those compositions which have been physically and/or chemically compatibilized with a polymeric compatibilizing agent and a functionalizing agent.

The functionalizing agent comprises a polyfunctional compound that is one of two types. The first type has in the molecule both (a) a carbon-carbon double bond and (b) at least one carboxylic acid, anhydride, epoxy, imide, amide, ester group or functional equivalent thereof. Examples of such polyfunctional compounds include maleic acid; maleic anhydride; fumaric acid; maleic hydrazide; dichloro maleic anhydride; and unsaturated dicarboxylic acids (e.g. acrylic acid, butenoic acid, methacrylic acid, t-ethylacrylic acid, pentenoic acid). In some embodiments, the functionalizing agent comprises maleic anhydride and/or fumaric acid.

The second type of polyfunctional functionalizing agent compounds are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and salts thereof. Typical of this type of functionalizing agents are the aliphatic polycarboxylic acids, acid esters and acid amides represented by the formula (IV):

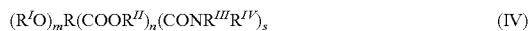

$$(R^IO)_mR(COOR^{II})_n(CONR^{III}R^{IV})_s \qquad (IV)$$

wherein R is a linear or branched chain saturated aliphatic hydrocarbon having 2 to 20, or, more specifically, 2 to 10 carbon atoms; $R^I$ is hydrogen or an alkyl, aryl, acyl or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In some embodiments, the functionalizing agent comprises citric acid. Illustrative of esters useful herein include, for example, acetyl citrate and mono- and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary suitable salts include calcium malate, calcium citrate, potassium malate, and potassium citrate.

The foregoing functionalizing agents may be added directly to the melt blend or pre-reacted with either or both the poly(arylene ether) and polyamide. In some embodiments, at least a portion of the functionalizing agent is pre-reacted, either in the melt or in a solution of a suitable solvent, with all or a part of the poly(arylene ether). It is believed that such pre-reacting may cause the functionalizing agent to react with the polymer and, consequently, functionalize the poly(arylene ether). For example, the poly(arylene ether) may be pre-reacted with maleic anhydride, fumaric acid and/or citric acid to form an anhydride and/or acid functionalized poly(arylene ether) which has improved compatibility with the polyamide compared to a non-functionalized poly(arylene ether).

The amount of the functionalizing agent used will be dependent upon the specific functionalizing agent chosen and the specific polymeric system to which it is added.

In some embodiments, the functionalizing agent is employed in an amount of 0.05 to 2.0 weight percent, based on the total weight of the composition. Within this range the amount of functionalizing agent may be greater than or equal to 0.1, or, more specifically, greater than or equal to 0.2 weight percent. Also within this range the amount of functionalizing agent may be less than or equal to 1.75, or, more specifically, less than or equal to 1.5 weight percent.

In addition to the compatibilized blend of polyphthalamide and poly(arylene ether), the flame resistant composition comprises a flame retardant. Exemplary flame retardants include phosphinates. The phosphinate may comprise one or more phosphinates of formula (V), (VI), or (VII)

(V)

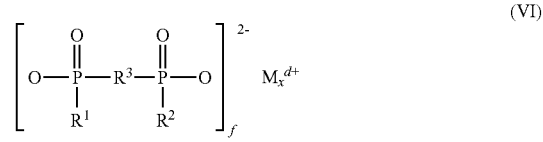

(VI)

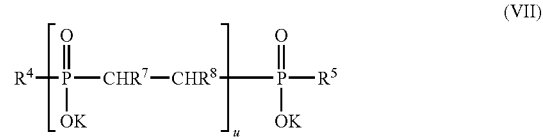

(VII)

wherein $R^1$ and $R^2$ are independently $C_1$-$C_6$ alkyl, phenyl, or aryl; $R^3$ is independently $C_1$-$C_{10}$ alkylene, $C_6$-$C_{10}$ arylene, $C_6$-$C_{10}$ alkylarylene, or $C_6$-$C_{10}$ arylalkylene; M is calcium, magnesium, aluminum, zinc or a combination comprising one or more of the foregoing; d is 2 or 3; f is 1 or 3; x is 1 or 2; each $R^4$ and $R^5$ are independently a hydrogen group or a vinyl group of the formula —$CR^7$=$CHR^8$; $R^7$ and $R^8$ are independently hydrogen, carboxyl, carboxylic acid derivative, $C_1$-$C_{10}$ alkyl, phenyl, benzyl, or an aromatic substituted with a $C_1$-$C_8$ alkyl; K is independently hydrogen or a 1/r metal of valency r and u, the average number of monomer units, may have a value of 1 to 20.

Examples of $R^1$ and $R^2$ include, but are not limited to, methyl, ethyl, n-propyl, isopropyl, n-butyl, tert-butyl, n-pentyl, and phenyl. Examples of $R^3$ include, but are not limited to, methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylethylene, phenylpropylene, and phenylbutylene.

The mono- and diphosphinates (formulas V and VI respectively) may be prepared by reacting the corresponding phosphinic acid with a metal oxide and/or metal hydroxide in an aqueous medium as taught in EP 0 699 708.

The polymeric phosphinates (formula VII) may be prepared by reacting hypophosphorous acid and or its alkali metal salt with an acetylene of formula (VIII)

$$R^7-C \equiv C-R^8 \qquad (VIII).$$

The resulting polymeric phosphinic acid or polymeric phosphinic acid salt is then reacted with a metal compound of groups IA, IIA, IIIA, IVA, VA, IIB, IVB, VIIB, VIIIB of the Periodic Table as taught in U.S. Patent Application No. 2003/0216533.

In some embodiments, $R^1$ and $R^2$ are ethyl and M is aluminum.

In one embodiment the phosphinate is in particulate form. The phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the phosphinate may be combined with a polymer, such as a poly(arylene ether), a polyphthalamide, and/or an impact modifier, to form a masterbatch. The phosphinate masterbatch comprises the phosphinate in an amount greater than is present in the thermoplastic composition. Employing a masterbatch for the addition of the phosphinate to the other components of the composition can facilitate addition and improve distribution of the phosphinate.

The flame resistant composition can comprise an amount of phosphinate sufficient to achieve a flame retardance of V-1 or better at a thickness of 1.0 millimeter according to UL94. In one embodiment the composition comprises an amount of phosphinate sufficient to achieve a flame retardance of V-0 at a thickness of 1.0 millimeter according to UL94. For example, the composition may comprise phosphinate in an amount of 5 to 25 weight percent. Within this range, the phosphinate may be present in an amount greater than or equal to 8 weight percent, or, more specifically, in an amount greater than or equal to 10 weight percent, or, even more specifically, in an amount greater than or equal to 12 weight percent. Also within this range the phosphinate may be present in an amount less than or equal to 22 weight percent, or, more specifically, less than or equal to 17 weight percent, or, even more specifically, less than or equal to 15 weight percent. Weight percent is based on the total weight of the thermoplastic composition.

In some embodiments the flame resistant composition can comprise an amount of phosphinate sufficient to achieve a flame retardance of V-1 or better at a thickness of 1.5 millimeters, or, more specifically, a flame retardance of V-0 at a thickness of 1.5 millimeters.

In some embodiments the flame resistant composition can comprise an amount of phosphinate sufficient to achieve a flame retardance of V-1 or better at a thickness of 2.0 millimeters, or more specifically, a flame resistance of V-0 at a thickness of 1.0 millimeters.

In some embodiments the flame resistant composition can comprise an amount of phosphinate sufficient such that less than or equal to 6, or, more specifically, less than or equal to 3, bars out of 50 bars will burn for more than 10 seconds. The bars have a thickness of 1 millimeter and the shape required by the UL 94 test. Testing conditions for determining the number of burning bars out of 50 bars are the same as UL 94.

The flame resistant composition may further comprise a flame retardant synergist such as zinc borate, melamine polyphosphate, nanoclay, amino functionalized silicone fluid, or a combination comprising one or more of the foregoing synergists.

In some embodiments, the flame resistant composition comprises a reinforcing filler. Non-limiting examples of reinforcing fillers include glass fiber, silica powder, such as fused silica and crystalline silica; boron-nitride powder and boron-silicate powders; alumina, and magnesium oxide (or magnesia); wollastonite including surface-treated wollastonite; calcium sulfate (as its anhydride, dihydrate or trihydrate); calcium carbonate including chalk, limestone, marble and synthetic, precipitated calcium carbonates, generally in the form of a ground particulates; talc, including fibrous, modular, needle shaped, and lamellar talc; glass spheres, both hollow and solid; kaolin, including hard, soft, calcined kaolin, and kaolin comprising various coatings known in the art to facilitate compatibility with the polymeric matrix resin; mica; feldspar; silicate spheres; flue dust; cenospheres; fillite; aluminosilicate (atmospheres); natural silica sand; quartz; quartzite; perlite; tripoli; diatomaceous earth; synthetic silica; nanoparticles, organoclay, and combinations thereof. All of the above fillers may be surface treated with silanes to improve adhesion and dispersion with the polymeric matrix resin.

Additional exemplary reinforcing fillers include flaked fillers that offer reinforcement such as glass flakes, flaked silicon carbide, aluminum diboride, aluminum flakes, and steel flakes. Exemplary reinforcing fillers also include fibrous fillers such as short inorganic fibers, natural fibrous fillers, single crystal fibers, glass fibers, and organic reinforcing fibrous fillers. Short inorganic fibers include those derived from blends comprising at least one of aluminum silicates, aluminum oxides, magnesium oxides, and calcium sulfate hemihydrate. Natural fibrous fillers include wood flour obtained by pulverizing wood, and fibrous products such as cellulose, cotton, sisal, jute, starch, cork flour, lignin, ground nut shells, corn, rice grain husks. Single crystal fibers or "whiskers" include silicon carbide, alumina, boron carbide, iron, nickel, and copper single crystal fibers. In addition, organic reinforcing fibrous fillers may also be used including organic polymers capable of forming fibers. Illustrative examples of such organic fibrous fillers include, for example, poly(ether ketone), polyimide, polybenzoxazole, poly(phenylene sulfide), polyesters, polyethylene, aromatic polyamides, aromatic polyimides or polyetherimides, polytetrafluoroethylene, acrylic resins, and poly(vinyl alcohol). Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture.

Reinforcing fillers, when present, are incorporated in an amount of 5 to 40 weight percent based on the total weight of the composition. Within this range the amount of reinforcing filler can be greater than or equal to 10 weight percent, or, more specifically, greater than or equal to 15 weight percent. Also within this range the amount of reinforcing filler can be less than or equal to 35, or, more specifically, less than or equal to 30 weight percent.

In some embodiments, the composition excludes electrically conductive fillers. In some embodiments the composition comprises an electrically conductive filler. The electrically conductive filler may be any filler that increases the electrical conductivity of the molded composition. Suitable electrically conductive fillers may be fibrous, disc-shaped, spherical or amorphous and include, for example, conductive carbon black; conductive carbon fibers, including milled fibers; conductive vapor-grown carbon fibers, and various mixtures thereof. Other electrically conductive fillers which can be used are metal-coated carbon fibers; metal fibers; metal disks; metal particles; metal-coated disc-shaped fillers such as metal-coated talcs, micas and kaolins; and the like. In some embodiments the electrically conductive fillers include carbon black, carbon fibers, and mixtures thereof, an illustrative example of which includes material available commercially from Akzo Chemical under the trademark Ketjen black EC600JD. In some embodiments, carbon black includes conductive carbon blacks having average particle sizes of less than 200 nanometers, or, more specifically, less than 100 nanometers, or, even more specifically, less than 50 nanometers. Conductive carbon blacks may also have surface areas greater than 200 square meters per gram ($m^2/g$), or, more specifically, greater than 400 $m^2/g$, or, even more specifically greater than 1000 $m^2/g$. Conductive carbon blacks may also have a pore volume (as measured by dibutyl phthalate absorption) of greater than 40 cubic centimeters per 100 grams ($cm^3/100$ g), or, more specifically, greater than 100 $cm^3/100$ g, or, even more specifically, greater than 150 $cm^3/100$ g. Conductive carbon blacks may also have a volatiles content less than 2 weight percent. Useful carbon fibers include the graphitic or partially graphitic vapor-grown carbon fibers having diameters of 3.5 to 500 nanometers, or, more specifically, diameters of 3.5 to 70 nanometers, or, even more specifically, diameters of 3.5 to 50 nanometers. Representative carbon fibers are the vapor-grown carbon fibers, such as those available from Hyperion, and double wall and single wall nanotubes such as those available from Carbon Nanotechnologies Incorporated (CNI). Conductive fillers of this type are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Generally, the electrically conductive filler, when used, will be present in an amount of 0.2 weight percent to 20 weight percent based on the total weight of the composition. The amount will depend on the nature of the conductive filler. For example, when the conductive filler is conductive carbon black, the amount can be 1 to 10 weight percent, or, more specifically, 1 to 8 weight percent, or, even more specifically, 1.4 to 7 weight percent. When the conductive filler is a vapor-grown carbon fiber, the amount can be 0.2 to 6 weight percent, or, more specifically, 0.5 to 4 weight percent based on the total weight of the composition. Conductive filler amounts less than the above lower limits often fail to provide adequate conductivity, while amounts greater than the above upper limits may tend to make the final blend brittle.

In some embodiments, the flame resistant composition comprises an impact modifier. As used herein, an "impact modifier" refers to an elastomeric polymer or copolymer having a glass transition temperature less than or equal to 0° C., specifically less than or equal to −20° C. One type of impact modifier is a rubber-containing copolymer of acrylonitrile and an alkenyl aromatic monomer. Another type of impact modifier is a block copolymer of alkenyl aromatic compound and a conjugated diene. Such block copolymers include A-B diblock copolymers and A-B-A triblock copolymers having of one or two poly(alkenyl aromatic) blocks, A, which are typically polystyrene blocks, and a poly(conjugated diene) rubber block, B, which is typically a polyisoprene or polybutadiene block. The polyisoprene or polybutadiene block may be partially or completely hydrogenated. Mixtures of these diblock and triblock copolymers may also be used as well as mixtures of non-hydrogenated copolymers, partially hydrogenated copolymers, fully hydrogenated copolymers, radial teleblock copolymers, tapered block copolymers, and combinations of two or more of the foregoing.

Suitable A-B and A-B-A block copolymers include, for example, polystyrene-polybutadiene (SB), polystyrene-poly (ethylene-butylene) (SEB), polystyrene-poly(ethylene-butylene)-polystyrene (SEBS), polystyrene-poly(ethylene-propylene) (SEP), polystyrene-polyisoprene (SI), poly(alpha-methylstyrene)-polybutadiene, polystyrene-polybutadiene-polystyrene (SBS), polystyrene-poly(ethylene-propylene)-polystyrene (SEPS), polystyrene-polyisoprene-polystyrene (SIS), poly(alpha-methylstyrene)-polybutadiene-poly(alpha-methylstyrene), polystyrene-poly(ethylene-propylene-styrene)-polystyrene, and the like, and mixtures thereof. Such A-B and A-B-A block copolymers are available commercially from a number of sources, including Phillips Petroleum under the trademark SOLPRENE, Kraton Polymers under the trademark KRATON, Dexco under the trademark VECTOR, Asahi Kasai under the trademark TUFTEC, Total Petrochemicals under the trademarks FINAPRENE and FINACLEAR, Kuraray under the trademark SEPTON, and Chevron Phillips Chemical Company under the tradename K-RESIN.

In some embodiments, the impact modifier comprises polystyrene-poly(ethylene-butylene)-polystyrene, polystyrene-poly(ethylene-propylene), or a mixture thereof.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic units present in an amount less than 5 weight percent, more specifically less than 3 weight percent, even more specifically less than 2 weight percent, based on the total weight of the block copolymer. When the impact modifier comprises a carboxylic acid moiety, the carboxylic acid moiety may be neutralized with an ion, preferably a metal ion such as zinc or sodium.

The impact modifier may be an alkylene-alkyl (meth)acrylate copolymer wherein the alkylene groups may have 2 to 6 carbon atoms, and the alkyl group of the alkyl (meth)acrylate may have 1 to 8 carbon atoms. This type of polymer can be prepared by copolymerizing an olefin, for example, ethylene and/or propylene, with various (meth)acrylate monomers and/or various maleic-based monomers. The fragment "(meth)acryl-" as used herein includes acryl- and methacryl-. Included within the term (meth)acrylate monomers are alkyl (meth)acrylate monomers as well as various (meth)acrylate monomers containing at least one of the aforementioned reactive moieties. In one embodiment, the copolymer is derived from ethylene, propylene, or mixtures of ethylene and propylene, as the alkylene component; butyl acrylate, hexyl acrylate, or propyl acrylate as well as the corresponding alkyl (methyl)acrylates, for the alkyl (meth)acrylate monomer component, with acrylic acid, maleic anhydride, glycidyl methacrylate or a combination thereof as monomers providing the additional reactive moieties (that is, carboxylic acid, anhydride, epoxy). Suitable impact modifiers of this type are commercially available from a variety of sources including those sold by DuPont under the tradenames ELVALOY PTW, SURLYN, and FUSABOND.

The aforementioned impact modifiers can be used singly or in combination.

The composition may comprise an impact modifier or combination of impact modifiers in an amount of 1 to 15 weight percent, based on the total weight of the composition.

The composition can, optionally, further comprise one or more other additives known in the thermoplastics arts. Useful additives include, for example, stabilizers, mold release agents, processing aids, drip retardants, nucleating agents, dyes, pigments, colorants, crystallization nucleators, metal salts, antioxidants, anti-static agents, plasticizers, lubricants, blowing agents, metal deactivators, antiblocking agents, nanoclays, fragrances (including fragrance-encapsulated polymers), and the like, and combinations thereof. Additives can be added in amounts that do not unacceptably detract from the desired performance and physical properties of the composition. Such amounts can be determined by a skilled artisan without undue experimentation. Generally, the total amount of additives will be less than or equal to 5 weight percent based on the total weight of the composition.

The composition can, optionally, exclude any polymer other than those taught herein as required.

The composition can be prepared using various techniques, including batch or continuous techniques that employ kneaders, extruders, mixers, and the like. For example, the composition can be formed as a melt blend employing a twin-screw extruder. In some embodiments at least some of the components are added sequentially. For example, the poly(arylene ether) and functionalizing agent may be added to the extruder at the feed throat or in feeding sections adjacent to the feed throat, while the polyphthalamide may be added to the extruder in a subsequent feeding section downstream. When a functionalized poly(arylene ether) is used the functionalized poly(arylene ether) may be added to the extruder at the feed throat or in feeding sections adjacent to the feed throat, while the polyphthalamide may be added to the extruder in a subsequent feeding section downstream. A vacuum system may be applied to the extruder, prior to the second sequential addition, to generate a sufficient vacuum to lower the residual levels of non-reacted functionalizing agent and any other volatile materials. In an alternative embodiment, the sequential addition of the components may be accomplished through multiple extrusions. A composition may be made by preextrusion of selected components, such as the poly(arylene ether) and the functionalizing agent to produce a pelletized mixture. A second extrusion may then be employed to combine the preextruded components with the remaining components. The electrically conductive filler, when used, can be added as part of a masterbatch or directly. The masterbatch of the electrically conductive filler can be added either at the feedthroat or down stream. The phosphinate may also be added as part of a masterbatch. The phosphinate masterbatch may be added down stream. The extruder may be a two lobe or three lobe twin screw extruder.

The phosphinate masterbatch may comprise a polyphthalamide and a phosphinate. The polyphthalamide can be present in an amount of 45 to 65 weight percent, based on the total weight of the masterbatch. The phosphinate can be present in an amount of 35 to 55 weight percent, based on the total weight of the masterbatch. In some embodiments the masterbatch consists of a phosphinate and a polyphthalamide.

The flame resistant composition can be used in injection molding to form thin wall and complex configuration articles such as electrical connectors, electronic connectors, electric housing and or electronic housing.

EXAMPLES

The examples used the materials described in Table 1 and in the following paragraphs.

TABLE 1

| Component | Grade | Supplier | Description |
|---|---|---|---|
| PPE | PPO (0.30 IV) | Sabic Innovative Plastics, US LLC | Poly(2,6-dimethyl-1,4-phenylene)ether with an intrinsic viscosity of 0.30 dl/g. |
| Citric Acid | Citric Acid | International Chemical Incorporated | Citric Acid - functionalizing agent |
| Anti-oxidant | Irganox 1076 | Great Lakes Chemcial Corporation | Heat Stabilizer |
| Liquid potassium iodide | Liquid KI | Ajay North America Incorporated | Heat Stabilizer |
| Cuprous Iodide | Cuprous Iodide | Ajay North America Incorporated | Heat Stabilizer |
| Calcium Stearate | Calcium Stearate | Ferro Corporation | Flow Promoter |
| PA 6/6 | Vydyne 21Z | Solutia Inc. | Polyamide 6/6 |
| Polyphthalamide I | Amodel A-1006C | Solvay Advanced Polymers | Semi-aromatic nylon |
| Polyphthalamide II | Amodel 6000C | Solvay Advanced Polymers | Semi-aromatic nylon |
| Polyphthalamide III | Zytel HTN501 | DuPont | Semi-aromatic nylon |
| Glass Fibers | Chopvantage 3540 | PPG Industries | Chopped glass fibers for polyamide |

Polyphthalamide I, Amodel A-1006C, is a copolymer comprising three different repeating units in the following amounts: (a) 60-70 mol % of units of formula (I) wherein $Q^1$ is a 1,6-hexyl group and the aromatic portion of the repeating unit is derived from terephthalic acid, (b) 20-30 mol % of units of formula (I) wherein $Q^1$ is a 1,6-hexyl group and the aromatic portion of the repeating unit is derived from isophthalic acid, and (c) 5-15 mol % of units of formula (II) wherein $Q^2$ is a 1,4-butyl group and $Q^3$ is a 1,6-hexyl group.

The amounts and structure of the repeating units was determined using nuclear magnetic resonance spectroscopy.

Polyphthalamide II, Amodel 6000C, is a copolymer comprising two different repeating units in the following amounts: (a) 55-65 mol % of units of formula (I) wherein Q, is a 1,6-hexyl group and the aromatic portion of the repeating unit is derived from terephthalic acid, and (b) 35-45 mol % of units of formula (II) wherein $Q^2$ is a 1,4-butyl group and $Q^3$ is a 1,6-hexyl group. The amounts and structure of the repeating units was determined using nuclear magnetic resonance spectroscopy.

Polyphthalamide III, Zytel HTN501, is a copolymer comprising two different repeating units in the following amounts: (a) 45-55 mol % of units of formula (I) wherein $Q^1$ is a 1,6-hexyl group and the aromatic portion of the repeating unit is derived from terephthalic acid, and (b) 45-55 mol % of units of formula (I) wherein $Q^1$ is a 2-methyl-1,5-pentyl group and the aromatic portion of the repeating unit is derived from terephthalic acid. The amounts and structure of the repeating units was determined using nuclear magnetic resonance spectroscopy.

The flame retardant used was Exolit OP1230 commercially available from Clariant Corporation. Exolit OP1230 is 100% diethyl aluminum phosphinate.

Examples 1-13 also contained 0.6 weight percent of a combination of stabilizers (Irganox 1076, potassium iodide and copper iodide). Example 13 also contained 0.3 weight percent of calcium stearate.

The examples were made by first forming masterbatches of the polyphthalamide and the flame retardant, Exolit OP1230.

The masterbatches were formed by melt blending 60 weight percent of the polyphthalamide and 40 weight percent of the Exolit OP1230, based on the total weight of the masterbatch in a 30 millimeter Werner Pleider twin screw extruder. The extruder was set with barrel temperatures of 290-310° C. and a die temperature of 320° C., with the screw rotating at 300 rotations per minute (rpm) and a rate of about 20 kilograms per hour.

The examples were made by melt blending the poly(arylene ether), citric acid, additives, additional polyphthalamide or polyamide (additional polyphthalamide meaning polyphthalamide not part of the flame retardant masterbatch) to form a first melt mixture and melt mixing the flame retardant masterbatch and glass fibers with the first melt mixture in a 30 millimeter Werner Pleider twin screw extruder. The extruder was set with barrel temperatures of 290-310° C. and a die temperature of 320° C., with the screw rotating at 200 rotations per minute (rpm) and a rate of about 20 kilograms per hour. The amounts of the components of the compositions are shown in Table 2. Amounts are in weight percent based on the total weight of the compositions. The compositions were injection molded to form bars having a thickness of 1.0 mm. Prior to molding the pellets were dried at 129° C. (265° F.) for 5 hours. The injection molding conditions were as follows. The injection mold was set to a temperature of 148° C. (300° F.) and the heating zones of the injection molding machine were all set at 321° C. (610° F.). The molded bars were tested for flammability according to UL94. Flammability of the compositions is expressed in Table 2 as the number of bars out of a total of 50 which burned longer than 10 seconds. The estimated UL94 rating is also provided. For ease of comparison the amount of phosphinate (FR) calculated from the amount of flame retardant masterbatch is included in Table 2. The calculated amount of aliphatic polyamide content in weight percent based on total polyamide content in the examples is also shown in Table 2. This amount is calculated from the amount of aliphatic units in the polyphthalamide and the amount of aliphatic polyamide. The sum of the weight percent of aliphatic units in the polyphthalamide and the amount of aliphatic polyamide was divided by the combined polyamide and polyphthalamide.

TABLE 2

| | 1* | 2* | *3 | 4 | 5* | 6* | 7 | 8* | 9* | 10 | 11 | 12 | 13 |
|---|---|---|---|---|---|---|---|---|---|---|---|---|---|
| PPE | 15.00 | 15.00 | 15.00 | 15.00 | 15.00 | 15.00 | 15.00 | 15.00 | 15.00 | 15.00 | 15.00 | 13.85 | 13.55 |
| CA | 0.50 | 0.50 | 0.50 | 0.50 | 0.50 | 0.50 | 0.50 | 0.50 | 0.50 | 0.50 | 0.50 | 0.45 | 0.45 |
| Polyphthalamide I | 34.00 | 29.00 | 24.00 | 29.00 | 24.00 | 19.00 | 24.00 | 19.00 | 14.00 | — | — | 22.00 | 30.00 |
| Polyphthalamide II | — | — | — | — | — | — | — | — | — | 24.00 | — | — | — |
| Polyphthalamide III | — | — | — | — | — | — | — | — | — | — | 24.00 | — | — |
| PA 6/6 | — | 5.00 | 10.00 | — | 5.00 | 10.00 | — | 5.00 | 10.00 | — | — | — | — |
| Glass Fibers | 30.00 | 30.00 | 30.00 | 30.00 | 30.00 | 30.00 | 30.00 | 30.00 | 30.00 | 30.00 | 30.00 | 33.00 | 30.00 |
| Polyphthalamide I/phosphinate MB | 20.00 | 20.00 | 20.00 | 25.00 | 25.00 | 25.00 | 30.00 | 30.00 | 30.00 | — | — | 30.00 | 25.00 |
| Polyphthalamide II/phosphinate MB | — | — | — | — | — | — | — | — | — | 30.00 | — | — | — |
| Polyphthalamide III/phosphinate MB | — | — | — | — | — | — | — | — | — | — | 30.00 | — | — |
| Estimated UL rating at 1 mm thickness | NA | NA | NA | V1 | NA | NA | V0 | NA | NA | V1 | V1 | V0 | V0 |
| Number of bars out of 50 that burned for more than 10 seconds | 18 | 50 | 50 | 6 | 41 | 50 | 0 | 31 | 39 | 6 | 12 | 0 | 0 |
| Calculated amount of phosphinate in wt % | 8 | 8 | 8 | 10 | 10 | 10 | 12 | 12 | 12 | 12 | 12 | 12 | 12 |
| Amount of aromatic units from polyphthalamide in composition | 41.86 | 37.31 | 32.76 | 40.04 | 35.49 | 30.94 | 38.22 | 33.67 | 29.12 | 25.20 | 42.00 | 36.40 | 40.95 |
| Amount of aliphatic units from polyphthalamide and polyamide in composition | 4.14 | 8.69 | 13.24 | 3.96 | 8.51 | 13.06 | 3.78 | 8.33 | 12.88 | 16.80 | 0.00 | 3.60 | 4.05 |
| Calculated amount of aliphatic polyamide content in wt % based on combined amount of polyphthalamide and polyamide | 9.00 | 18.89 | 28.78 | 9.00 | 19.34 | 29.68 | 9.00 | 19.83 | 30.67 | 40.00 | 0.00 | 9.00 | 9.00 |

*Comparative Example

Table 2 shows that blending an aliphatic polyamide, PA6/6, negatively effects the flame performance of a given composition. Comparing example 7 to examples 8 and 9 illustrates this concept. For example, example 7, which contains no aliphatic polyamide, has no bars that do not extinguish in 10 seconds or less. When 5 weight percent of the polyphthalamide is replaced with aliphatic polyamide (example 8) 31 out of 50 bars fail to extinguish in 10 seconds or less. Furthermore, when an aliphatic polyamide is added in addition to the polyphthalamide (as in example 8 and 9) the flame retardance is significantly worse than when the composition includes a polyphthalamide comprising more aliphatic subunits (as in example 10). This is unexpected. Since example 10 has more aliphatic units in the total polyamide it would be expected to have worse flame retardance performance but the fact that the aliphatic polyamide units are part of the polyphthalamide appears to have an unexpected effect. Stated in another way, when the aliphatic polyamide is part of the polyphthalamide the composition has greater flame retardance than when the aliphatic polyamide is added as a separate polymer in addition to the polyphthalamide. This is true despite the fact that example 10 contains more aliphatic polyamide units overall than example 8.

In the specification and the claims, reference is made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A flame resistant composition comprising:
   a polyphthalamide;
   a poly(arylene ether); and
   a phosphinate,
   wherein the composition is substantially free of aliphatic polyamide.

2. The composition of claim 1, wherein the composition has a flammability rating of V-1 or better measured according to the UL 94 Vertical Burning Test at a thickness of 1 millimeter.

3. The composition of claim 1, wherein less than or equal to 6 bars, molded from the composition claim 1 and having a thickness of 1 millimeter, out of 50 bars having a thickness of 1 millimeter and molded from the composition of claim 1 burn for more than 10 seconds.

4. The composition of claim 1, wherein the polyphthalamide is present in an amount of 25 to 60 weight percent, the poly(arylene ether) is present in an amount of 10 to 30 weight percent, the phosphinate is present in an amount of 10 to 15 weight percent, and weight percent is based on the total weight of the composition.

5. The composition of claim 1, wherein the composition further comprises a reinforcing filler.

6. The composition of claim 5, wherein the reinforcing filler is present in an amount of 15 to 35 weight percent, based on the total weight of the composition.

7. The composition of claim 1, further comprising an impact modifier, an electrically conductive filler or a combination thereof.

8. The composition of claim 1, wherein the phosphinate is diethyl aluminum phosphinate.

9. An injection molded article comprising the composition of claim 1.

10. A masterbatch consisting of polyphthalamide and a phosphinate.

11. The masterbatch of claim 10, wherein the polyphthalamide is present in an amount of 45 to 65 weight percent and the phosphinate is present in an amount of 35 to 55 weight percent, based on the total weight of the masterbatch.

12. A flame resistant composition produced by melt blending components comprising a poly(arylene ether), a functionalizing agent and a polyphthalamide to form a first mixture and then melt blending the first mixture with masterbatch comprising a polyphthalamide and a phosphinate, wherein the composition is substantially free of aliphatic polyamide.

13. A flame resistant composition produced by melt blending components comprising a poly(arylene ether), a functionalizing agent and a polyphthalamide to form a first mixture and then melt blending the first mixture with reinforcing filler and a masterbatch comprising a polyphthalamide and a phosphinate, wherein the composition is substantially free of aliphatic polyamide.

14. A flame resistant composition comprising:
   15 to 80 weight percent of a polyphthalamide;
   5 to 50 weight percent of a poly(arylene ether);
   5 to 40 weight percent of a reinforcing filler; and
   greater than or equal to 12 weight percent of a phosphinate,
   wherein the composition is substantially free of aliphatic polyamide and weight percent is based on the total weight of the flame resistant composition.

15. The composition of claim 14, wherein the phosphinate is diethyl aluminum phosphinate.

16. The composition of claim 14, wherein the reinforcing filler is glass fiber.

17. The composition of claim 14, further comprising an impact modifier, an electrically conductive filler or a combination thereof.

18. The composition of claim 14, wherein the composition has a flammability rating of V-1 or better measured according to the UL 94 Vertical Burning Test at a thickness of 1 millimeter.

19. The composition of claim 14, wherein less than or equal to 6 bars, molded from the composition claim 1 and having a thickness of 1 millimeter, out of 50 bars having a thickness of 1 millimeter and molded from the composition of claim 1 burn for more than 10 seconds.

20. The composition of claim 1, wherein the flame resistant composition consists essentially of a polyphthalamide; a poly(arylene ether); and a phosphinate.

21. The composition of claim 1, wherein the flame resistant composition is free of a flame retardant synergist.

22. A flame resistant composition consisting of:
   a polyphthalamide;
   a poly(arylene ether);
   a phosphinate, an optional reinforcing filler;
an optional electrically conductive filler;
an optional impact modifier; and
an optional additive selected from the group consisting of stabilizers, mold release agents, processing aids, drip retardants, nucleating agents, dyes, pigments, colorants, crystallization nucleators, antioxidants, fragrances, and combinations thereof,
wherein the composition is substantially free of aliphatic polyamide.

* * * * *